United States Patent
Horie et al.

(10) Patent No.: US 6,489,053 B1
(45) Date of Patent: Dec. 3, 2002

(54) MULTILAYER BATTERY CELL AND METHOD OF PRODUCING SAME

(75) Inventors: Hideaki Horie, Kanagawa (JP); Takaaki Abe, Kanagawa (JP); Mikio Kawai, Kanagawa (JP); Yasuhiko Ohsawa, Kanagawa (JP); Yuuji Tanjou, Yokohama (JP); Osamu Shimamura, Kanagawa (JP); Tatsuhiro Fukuzawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 102 days.

(21) Appl. No.: 09/631,788

(22) Filed: Aug. 3, 2000

(30) Foreign Application Priority Data

Aug. 4, 1999 (JP) ............................................ 11-220907

(51) Int. Cl.$^7$ ............................. H01M 2/00; H01M 6/12
(52) U.S. Cl. ........................ 429/162; 429/163; 429/233; 429/234; 429/245
(58) Field of Search ................................ 429/162, 163, 429/233, 234, 245; 29/623.5

(56) References Cited

U.S. PATENT DOCUMENTS

| | | | |
|---|---|---|---|
| 5,296,318 A | 3/1994 | Gozdz et al. | 429/192 |
| 5,705,292 A | 1/1998 | Yukita et al. | 429/137 |
| 6,190,426 B1 * | 2/2001 | Thibault et al. | 29/623.1 |

FOREIGN PATENT DOCUMENTS

| | | |
|---|---|---|
| JP | 03-159069 | 7/1991 |
| JP | 11-260355 | 9/1999 |
| WO | 99/23714 | 5/1999 |

OTHER PUBLICATIONS

Doyle et al.; "Comparison of Modeling Predictions with Experimental Data from Plastic Lithium Ion Cells"; Journal of Electrochemistry Society; vol. 143, No. 6; Jun. 1996; pp. 1890–1903.

* cited by examiner

Primary Examiner—Laura Weiner
(74) Attorney, Agent, or Firm—Foley & Lardner

(57) ABSTRACT

A multilayer battery cell comprises an ion-conductive separator film. A positive electrode layer is disposed on one surface of the separator film. A negative electrode layer is disposed on the other surface of the separator film. A first conductive layer is disposed on the positive electrode layer and electrically connected to the same. A second conductive layer is disposed on the negative electrode layer and electrically connected to the same. The positive and negative electrode layers and the first and second conductive layers are each produced by employing a spraying process.

10 Claims, 6 Drawing Sheets

MULTILAYER BATTERY CELL AND METHOD OF PRODUCING SAME

BACKGROUND OF INVENTION

1. Field of Invention

The present invention relates in general to rechargeable batteries and method of producing same, and more particularly to rechargeable lithium ion batteries and method of producing same. More specifically, the present invention is concerned with a multilayer battery cell used as an essential element of the battery and a method of producing same.

2. Description of Prior Art

In order to clarify the task of the present invention, one known multilayer battery cell will be briefly described with reference to FIG. 11 of the accompanying drawings.

The drawing shows an enlarged sectional view of the known multilayer battery cell 9 for the battery. As shown, the known battery cell 9 comprises positive and negative electrode parts "P" and "N" which are put on each other to form a laminated assembly. The positive electrode part "P" comprises a metallic foil current collector 1 that has positive electrode layers 2 at both surfaces thereof and two separator films 3 and 4 that intimately put therebetween the positive electrode layers 2. Similar to this, the negative electrode part "N" comprises a metallic foil current collector 5 that has negative electrode layers 6 at both surfaces thereof and two separator films 7 and 8 that intimately put therebetween negative electrode layers 6. Although not shown, the multilayer battery cell 9 is to be wound up to form a shaped unit. The shaped unit is received in a case filled with an electrolytic solution. A lid is fixed to the case to complete the battery. This type battery is shown in page 542 of "Battery Handbook" issued from MARUZEN Co., Ltd. in 1995, and pages 217 and 320 of "High Density Lithium Secondary Battery" issued from TECHNOSYSTEM Co., Ltd.

However, as is easily understood from the drawing, the multilayer battery cell 9 has a complicated structure due to usage of numerous parts and elements such as foil current collectors 1 and 5, and separator films 3, 4, 7 and 8. The complicated structure brings about not only a bulky construction of the battery but also a time-consuming production process of the same, that causes increase in cost of the battery.

SUMMARY OF INVENTION

It is therefore an object of the present invention to provide a multilayer battery cell which is simple in construction and easy to be produced.

According to a first aspect of the present invention, there is provided a multilayer battery cell comprising a separator film that is ion-conductive; a positive electrode layer disposed on one surface of the separator film, the positive electrode layer being provided by spraying on the surface of the separator film a first predetermined composition; a negative electrode layer disposed on the other surface of the separator film, the negative electrode layer being provided by applying on the other surface of the separator film a second predetermined composition; a first conductive layer disposed on the positive electrode layer and electrically connected to the same; and a second conductive layer disposed on the negative electrode layer and electrically connected to the same.

According to a second embodiment of the present invention, there is provided a multilayer battery cell which comprises an ion-conductive separator film including a porous plastic film that has pores filled with ion-conductive additive; a positive electrode layer disposed on one surface of the separator film, the positive electrode layer being provided by applying on the surface of the separator film an oxide of lithium metal complex; a negative electrode layer disposed on the other surface of the separator film, the negative electrode layer being provided by applying on the other surface of the separator film a carbon powder or an oxide of lithium metal complex; a first conducive layer disposed on the positive electrode layer and electrically connected to the same, the first conductive layer having a first portion that is in contact with both the separator film and the positive electrode layer; a second conductive layer disposed on the negative electrode layer and electrically connected to the same, the second conductive layer having a second portion that is in contact with both the separator film and the negative electrode layer; a first insulating layer disposed on the first conductive layer and having a portion that is in contact with both the separator film and the positive electrode layer; and a second insulating layer disposed on the second conductive layer and having a portion that is in contact with both the separator film and the negative electrode layer, wherein the positive and negative electrode layers, the first and second conductive layers and the first and second insulating layers are each provided by a spraying or printing process and wherein upon charging and discharging, ion transfer takes place between the positive and negative electrode layers through the separator film.

According to a third aspect of the present invention, there is provided a method of producing a multilayer battery. The method comprises conveying an ion-conductive separator film in a given direction, the separator film having first and second surfaces; spraying first and second predetermined compositions on the first and second surfaces of the separator film respectively, the first and second predetermined compositions being those for producing positive and negative electrode layers; drying the first and second predetermined compositions thereby to form the positive and negative electrode layers on the first and second surfaces of the separator film; spraying third and fourth predetermined compositions on the positive and negative electrode layers thus produced; and drying the third and fourth predetermined compositions thereby to form first and second conductive layers on the positive and negative electrode layers respectively.

DETAILED DESCRIPTION OF THE EMBODIMENTS

Figure 1:
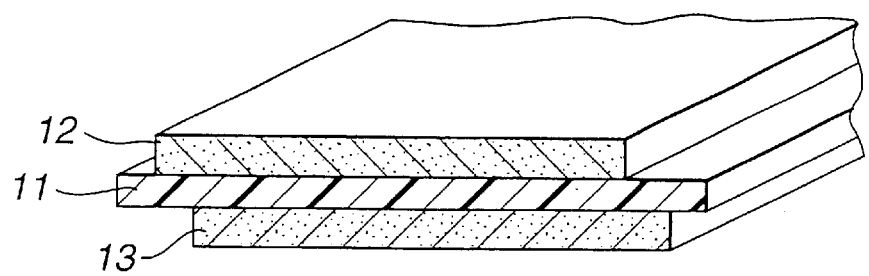
FIG. 1 is a diagrammatic representation of a multilayer battery cell that is a first embodiment of the present invention.

In the following, embodiments of the present invention will be described in detail with reference to the accompanying drawings.

Throughout the specification, the same reference numerals indicate substantially the same parts and constructions.

Referring to FIG. 1, there is shown in a sectional manner a multilayer battery cell 100A which is a first embodiment of the present invention. It is to be noted that the multilayer battery cell 100A has a flat-strip shape having a size of about 10 to 30 cm in width, about 50 to 100 $\mu$m in thickness and 100 m in length.

The cell 100A comprises a strip-like separator film 11, a strip-like positive electrode layer 12 formed on one surface of separator film 11, and a strip-like negative electrode layer 13 formed on the other surface of separator film 11.

The separator film 11 is an ion-conductive film, that is, a heat resistant porous plastic film that has at least some of pores filled with ion-conductive additive. The plastic film is made of polyethylene (PE), polypropylene (PP) or polyimide. As will be described in detail hereinafter, the positive electrode layer 12 is provided by applying or spraying on one surface of separator film 11 a lithium oxide composition and drying the same. The lithium oxide composition is provided by mixing a lithium oxide (such as, $LiCoO_2$, $LiMn_2O_4$, $LiMnO_2$, $LiNiO_2$ or the like), an electrically conductive additive and an ion-conductive additive. The negative electrode layer 13 is provided by applying or spraying on the other surface of separator film 11 an ion-conductive composition and drying the same. The ion-conductive composition for the negative electrode layer 13 is prepared by mixing a carbon powder and an ion-conductive additive. As will be described in detail hereinafter, application of the composition on both surfaces of separator film 11 is carried out by a spraying process.

For achieving effective flow of ion (viz., lithium ion) through separator film 11, the separator film 11 should made as thin as possible. In the illustrated embodiment 100A, the thickness of separator 11 is not greater than 20 $\mu$m. For the same reason, the thickness of each of the positive and negative electrode layers 12 and 13 is not greater than 20 $\mu$m.

The multilayer battery cell 100A is wound up to constitute a shaped unit. This shaped unit is received in a case and a lid is fixed to the case to complete a lithium ion battery. It is now to be noted that in this battery, there is no need of feeding the case with an electrolyte solution.

When the battery is under discharging, lithium ions transfer from positive electrode layer 12 to negative electrode layer 13 through separator film 11. While, when the battery is under charging, lithium ions transfer from negative electrode layer 13 to positive electrode layer 12 through separator film 11.

As is understood from the above, the cell 100A has a simple structure and thus a battery including cell 100A can be constructed compact in size and can be produced at a low cost.

For producing the multilayer battery cell 100A, the following method is employed.

Figure 6:
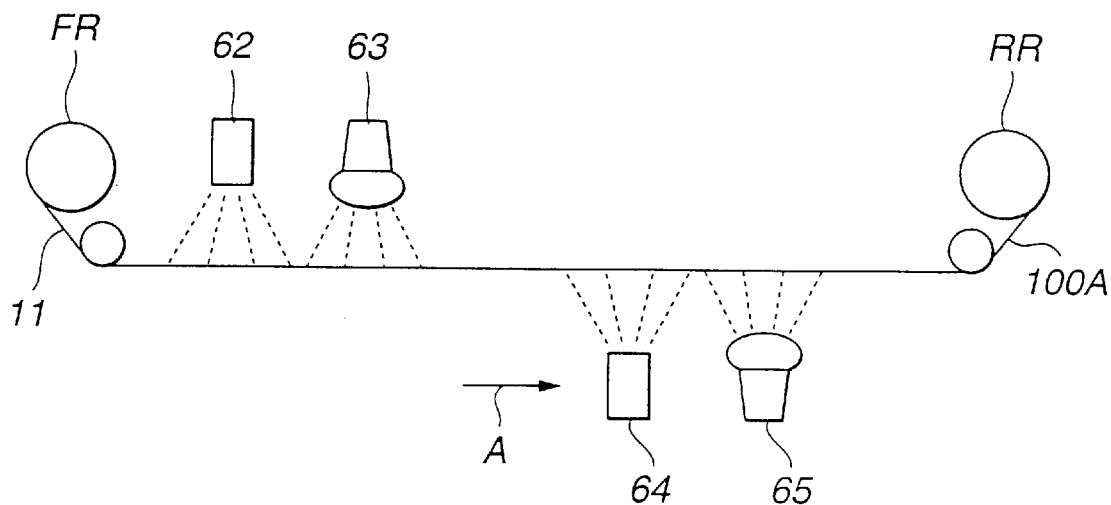
FIG. 6 is a schematic view of a production line for producing the multilayer battery cell of the first embodiment of the invention.

As is seen from FIG. 6, the separator film 11 is fed from a feeding roller "FR" to a rewinding roller "RR" traveling through a treating zone in the direction of arrow "A". Along one side of an upstream part of the treating zone, there are arranged a first sprayer 62 and a first dryer 63 and along the other side of a downstream part of the treating zone, there are arranged a second sprayer 64 and a second dryer 65. The first sprayer 62 sprays the above-mentioned lithium oxide composition and the second sprayer 64 sprays the above-mentioned ion-conductive composition.

That is, during traveling of separator film 11, the lithium oxide composition is sprayed onto one or upper surface of film 11 by first sprayer 62 and dried by first dryer 63 to form positive electrode layer 12, and then the ion-conductive composition is sprayed onto the other or lower surface of film 11 by second sprayer 64 and then dried by second dryer 65 to form negative electrode layer 13.

EXAMPLE

The multilayer battery cell 100A of the first embodiment will be much clarified from the following that describes an example of the first embodiment.

Figure 10:
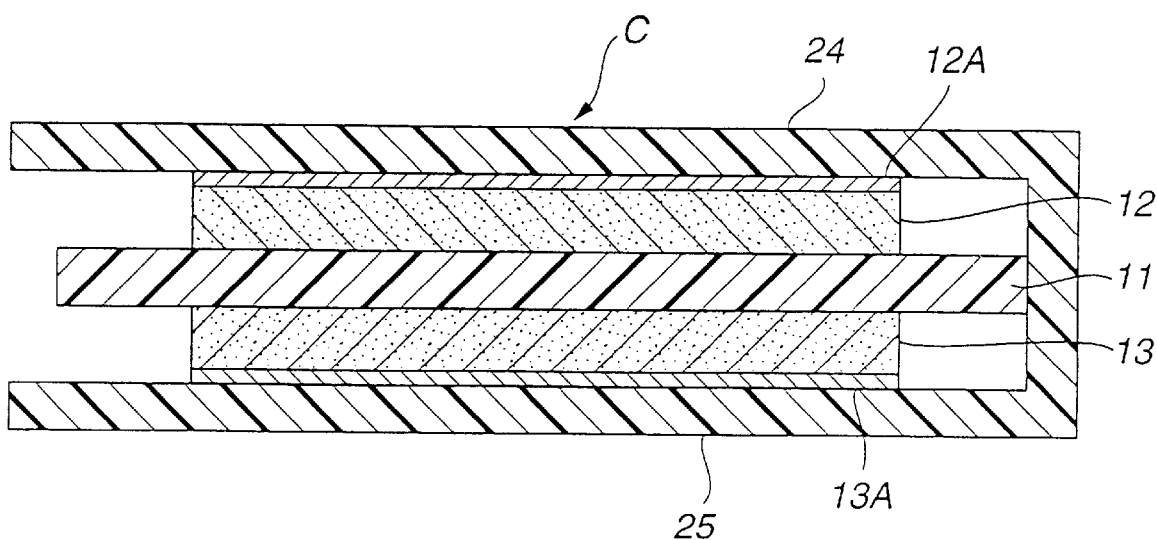
FIG. 10 is an enlarged sectional view of a cell that was produced in accordance with a method of the present invention.
Figure 11:
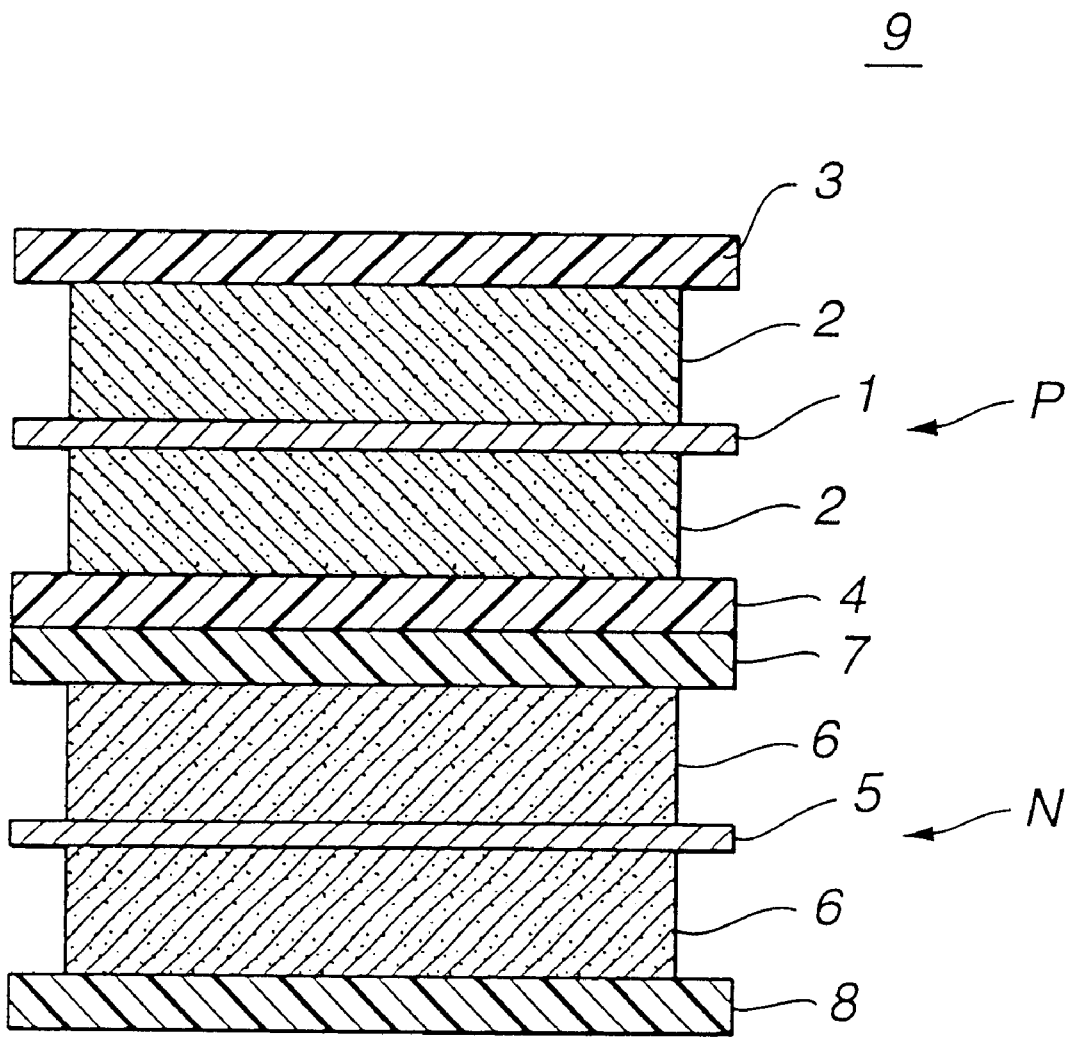
FIG. 11 is a sectional view of a known multilayer battery cell for a battery.

That is, in the example, a multilayer battery cell "C" according to the present invention, that is, a multilayer battery cell "C" using a lithium salt-contained polymer electrolyte as an ion conductive layer was produced. The description will proceed with the aid of FIG. 10.

As the ion conductive layer or separator 11, a porous polyimide film having $Li_{1.3}Al_{0.3}Ti_{1.7}(PO_4)_3$ trapped in pores thereof was used. The porous polyimide film was produced by using the following method.

By using 3,3',4,4'-biphenyltetracarboxylic dianhydride and 4,4'-oxydianiline, a polyamic acid solution was prepared and adjusted. The polyamic acid solution was spilled over a glass base plate, and a porous polyolefine film was put on the glass base plate to cover the spilled polyamic acid solution. Then, the glass base plate was entirely submerged in a coagulation bath to form a porous polyamic acid film on the glass base plate. Then, the glass base plate was heated at about 300° C. With this, a porous polyimide film of about 30 $\mu$m thickness was prepared.

$Li_{1.3}Al_{0.3}Ti_{1.7}(PO_4)_3$ as an ion conductive additive was prepared by using a method described in the reference (Electrochimica. Acta, Vol. 43 (1998) 1333.). The ion conductive addition was dispersed in ethanol and fined by using a ball mill. Then, into the additive dispersed ethanol, the above-mentioned porous polyimide film was submerged to fill the fine particles of additive into the pores of the film and then pulled out from the additive dispersed ethanol and dried. With this, the ion conductive layer 11 was prepared.

Then, the positive and negative electrode layers 12 and 13 were formed on both surfaces of ion conductive layer 11 by taking the following method.

As an active material for positive electrode 12, a mixture including 40% by weight $LiMn_2O_4$, 5% by weight carbon black and 200% by weight cross-linkable polyether type monomer, 35% by weight electrolytic solution and 0.2% by weight azoisobutylnitrile was used. The monomer was shown in the reference (J. Electrochem. Soc. 145 (1998) 1521). The mixture was stirred well to form a slurry. The slurry was sprayed onto one surface of ion conductive layer 11 and dried under reduced pressure at about 90° C. for about 2 hours. With this, the positive electrode layer 12 was formed on the surface of ion conductive layer 11. The electrolyte solution added to the mixture was prepared by adding 1 mol/little $LiPF_6$ salt to a mixture of 1 by volume ratio propylene carbonate and 1 by volume ratio dimethyl carbonate. By employing a similar process and using a hard carbon, the negative electrode layer 13 was produced on the other surface of ion conductive layer 11. Then, by using a lower temperature thermal spraying process, an aluminum collector layer 12A was formed on positive electrode layer 12 and a copper collector layer 13A was formed on negative electrode layer 13. With these steps, the multilayer battery cell "C" was produced. Each layer 12A or 13A had a thickness of about 10 μm. The thickness of ion conductive layer 11 was about 20 μm, the thickness of positive electrode layer 12 was about 70 μm and that of negative electrode layer 13 was about 80 μm. Polypropylene type hot melt sealing material was used for producing insulating layers 24 and 25 (see FIG. 2).

The strip-like cell "C" was wound up to constitute a shaped unit about 10 by 10 by 10 centimeters and subjected to charging/discharging tests at a temperature of 50 to 60° C. The results revealed that the unit had a sufficient performance as a rechargeable battery.

Figure 2:
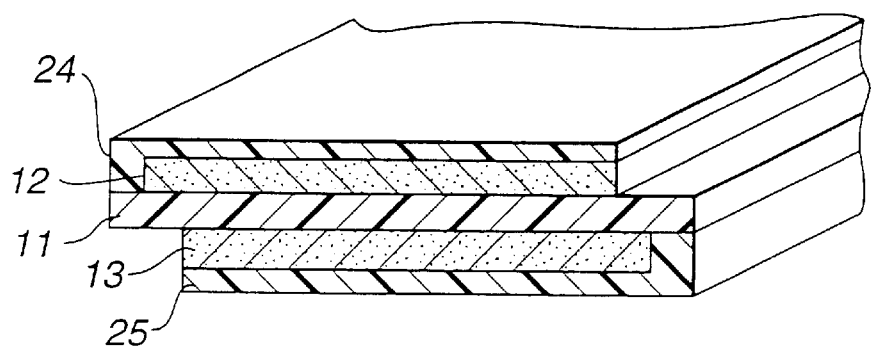
FIGS. 2, 3 and 4 are views similar to FIG. 1, but showing second, third and fourth embodiments of the present invention.

Referring to FIG. 2, there is shown in a sectional manner a multilayer battery cell 100B which is a second embodiment of the present invention.

The cell 100B comprises a separator film 11, a positive electrode layer 12 and a negative electrode layer 13 which are assembled in the same manner as in the above-mentioned first embodiment of FIG. 1. A first insulating layer 24 covers an almost entirety of positive electrode layer 12 and a second insulating layer 25 covers an almost entirety of negative electrode layer 13, as shown. The insulating layers 24 and 25 are provided by a spraying process. As shown, the first insulating layer 24 has an edge portion that is in contact with both separator film 11 and positive electrode layer 12, and the second insulating layer 25 has an edge portion that is in contact with both separator film 11 and negative electrode layer 13.

For producing the multilayer battery cell 100B, the following method is employed.

Figure 7:
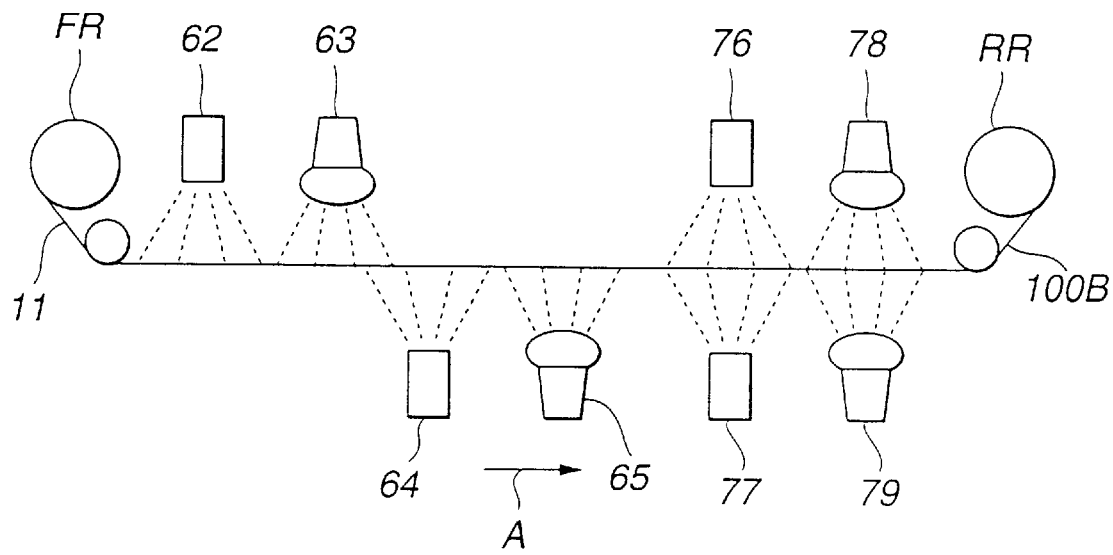
FIGS. 7, 8 and 9 are views similar to FIG. 6, but showing production lines for producing the multilayer battery cells of the second, third and fourth embodiments of the invention.

As is seen from FIG. 7, along one side of an upstream part of the treating zone, there are arranged a first sprayer 62 and a first dryer 63, along the other side of an intermediate part of the treating zone, there are arranged a second sprayer 64 and a second dryer 65 and along both sides of a downstream part of the treating zone, there are arranged third and fourth sprayers 76 and 77 and third and fourth dryers 78 and 79, as shown. The third and fourth sprayers 76 and 77 spray a material for first and second insulating layers 24 and 25.

During traveling of separator film 11 in the direction of arrow "A", the lithium oxide composition is sprayed onto one or upper surface of film 11 by first sprayer 62 and dried by first dryer 63 to form positive electrode layer 12, and then the ion-conductive composition is sprayed onto the other or lower surface of film 11 by second sprayer 64 and then dried by second dryer 65 to form negative electrode layer 13. Then, from third and fourth sprayers 76 and 77, the material for insulating layers 24 and 25 is sprayed onto both surfaces of film 11 and dried by dryers 78 and 79 to form on positive and negative electrode layers 12 and 13 first and second insulating layers 24 and 25 respectively.

Figure 3:
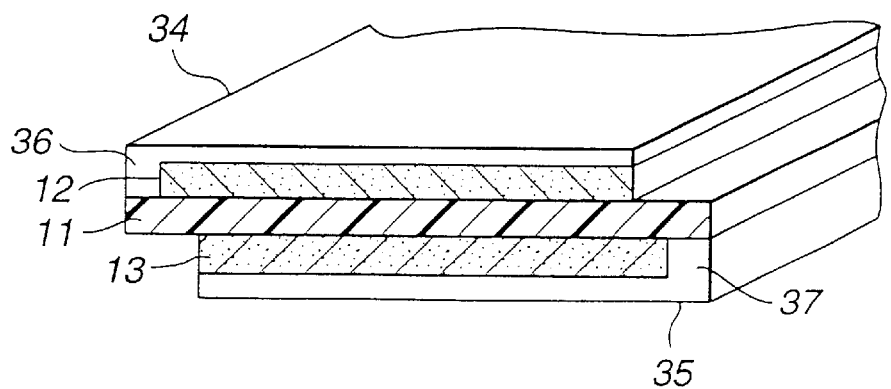

Referring to FIG. 3, there is shown in a sectional manner a multilayer battery cell 100C which is a third embodiment of the present invention.

The cell 100C comprises a separator film 11, a positive electrode layer 12 and a negative electrode layer 13 which are assembled in the same manner as in the above-mentioned first embodiment of FIG. 1. A first electrically conductive layer 34 covers an almost entirety of positive electrode layer 12 and a second electrically conductive layer 35 covers an almost entirety of negative electrode layer 13, as shown. The first conductive layer 34 has an edge portion 36 that is in contact with both separator film 11 and positive electrode layer 12, and the second conductive layer 35 has an edge portion 37 that is in contact with both separator film 11 and negative electrode layer 13. The conductive layers 34 and 35 are provided by a spraying process. If desires, these conductive layers 34 and 35 may have an airtight and waterproof material.

For producing the multilayer battery cell 100C, the following method is employed.

Figure 8:
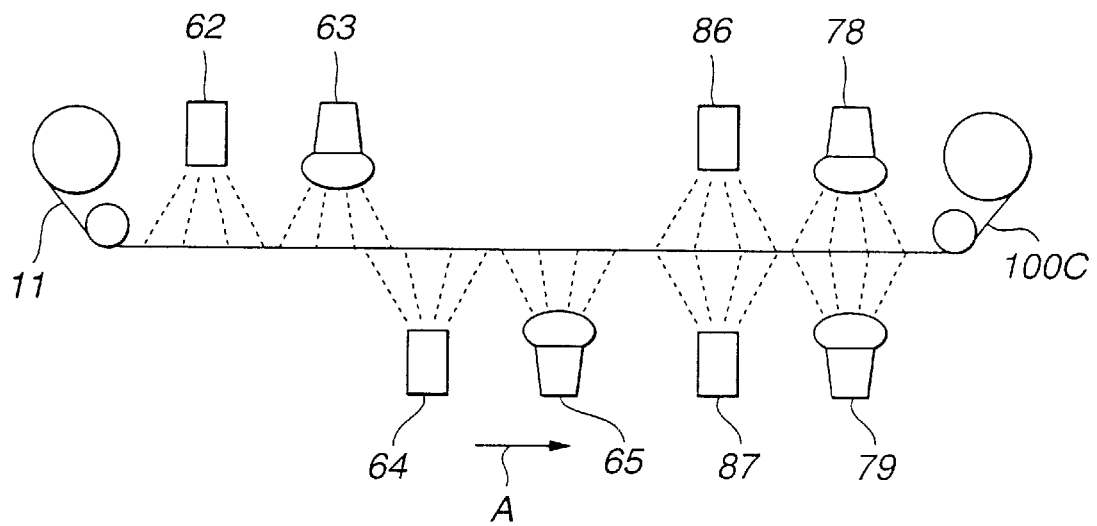

As is seen from FIG. 8, along one side of an upstream part of the treating zone, there are arranged a first sprayer 62 and a first dryer 63, along the other side of an intermediate part of the treating zone, there are arranged a second sprayer 64 and a second dryer 65 and along both sides of a downstream part of the treating zone, there are arranged fifth and sixth sprayers 86 and 87 and third and fourth dryers 78 and 79, as shown. The fifth and sixth sprayers 86 and 87 spray a material for first and second conductive layers 34 and 35.

During traveling of separator film 11 in the direction of arrow "A", the lithium oxide composition is sprayed onto one or upper surface of film 11 by first sprayer 62 and dried by first dryer 63 to form positive electrode layer 12, and then the ion-conductive composition is sprayed onto the other or lower surface of film 11 by second sprayer 64 and then dried by second dryer 65 to form negative electrode layer 13. Then, from fifth and sixth sprayers 86 and 87, the material for conductive layers 34 and 35 is sprayed onto both surfaces of film 11 and dried by dryers 78 and 79 to form on positive and negative electrode surfaces 12 and 13 first and second conductive layers 34 and 35 respectively.

Figure 4:
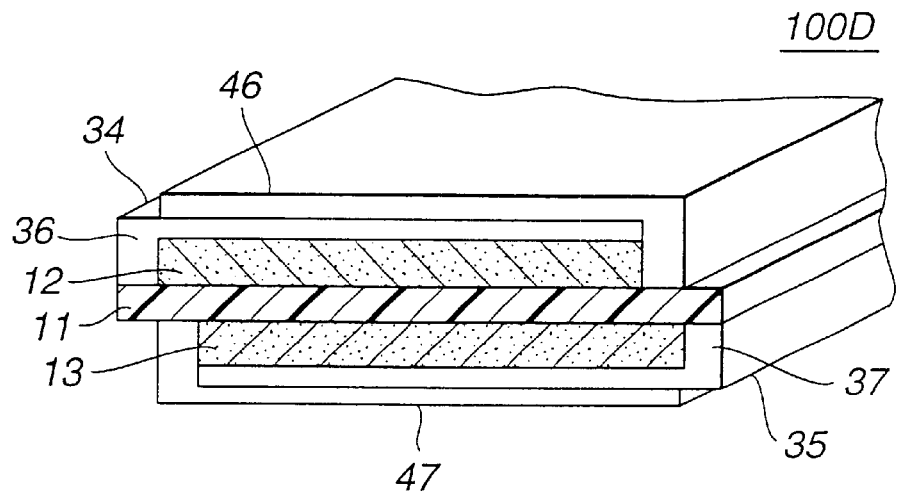

Referring to FIG. 4, there is shown in a sectional manner a multilayer battery cell 100D which is a fourth embodiment of the present invention.

The cell 100D comprises a separator film 11, a positive electrode layer 12, a negative electrode layer 13, a first electrically conductive layer 34 and a second electrically conductive layer 35 which are assembled in the same manner as in the above-mentioned third embodiment of FIG. 3. A first insulating layer 46 covers an almost entirety of first conductive layer 34 and a second insulating layer 47 covers an almost entirety of second conductive layer 35, as shown. The first insulating layer 46 has an edge portion that is in contact with both separator film 11 and positive electrode layer 12, and the second insulating layer 47 has an edge portion that is in contact with both separator film 11 and negative electrode layer 13. These insulating layers 46 and 47 are provided by a spraying process. Due to provision of insulating layers 46 and 47, sealing of cell 100D is assured.

For producing the multilayer battery cell 100D, the following method is employed.

Figure 9:
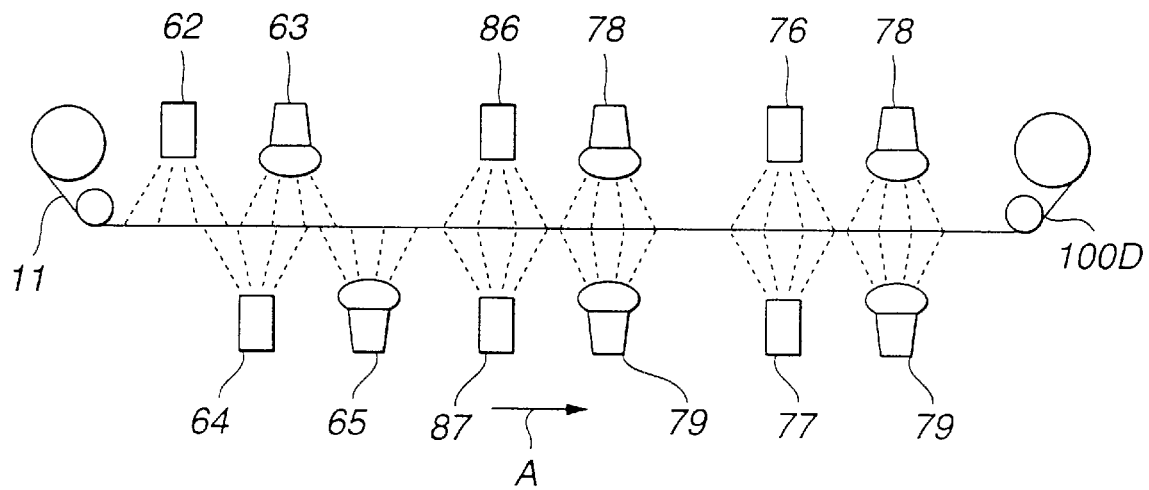

As is seen from FIG. 9, along one side of an upstream part of the treating zone, there are arranged a first sprayer 62 and a first dryer 63 and along the other side of the upstream part, there are arranged a second sprayer 64 and a second dryer 65. Along both sides of an intermediate part of the treating zone, there are arranged fifth and sixth sprayers 86 and 87 and third and fourth dryers 78 and 79, and along both sides of a downstream part of the treating zone, there are arranged third and fourth sprayers 76 and 77 and third and fourth dryers 78 and 79, as shown.

During traveling of separator film 11 in the direction of arrow "A", the lithium oxide composition is sprayed onto one or upper surface of film 11 by first sprayer 62 and dried by first dryer 63 to form positive electrode layer 12 and the ion-conductive composition is sprayed onto the other or lower surface of film 11 by second sprayer 64 and dried by second dryer 65 to form negative electrode layer 13. Then, from fifth and sixth sprayers 86 and 87, the material for conductive layers 34 and 35 is sprayed onto both surfaces of film 11 and dried by dryers 78 and 79 to form on positive and negative electrode layers 12 and 13 first and second conductive layers 34 and 35 respectively. Then, from third and fourth sprayers 76 and 77, the material for insulating layers 46 and 475 is sprayed onto both surfaces of film 11 and dried by dryers 78 and 79 to form on first and second conductive layers 34 and 35 first and second insulating layers 46 and 47 respectively.

Figure 5A:
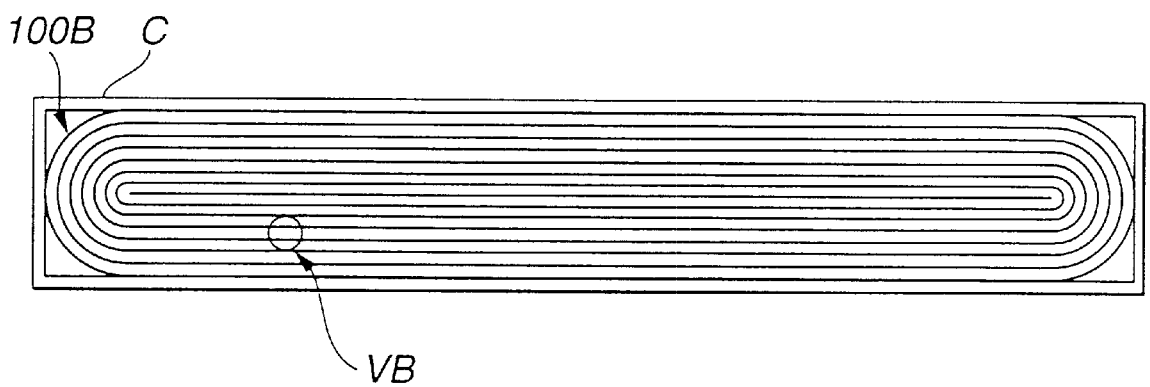
FIG. 5A is a sectional view of a shaped unit that is produced by winding up the multilayer battery cell of the second embodiment of FIG. 2.
Figure 5B:
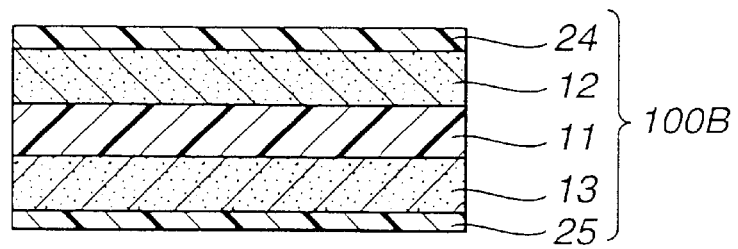
FIG. 5B is an enlarged view of the part indicated by the arrow "VB" in FIG. 5A.

Referring to FIG. 5A, there is shown a sectional view of a battery that includes a case "C" and a shaped or wound up unit of battery cell 100B of the second embodiment. As shown, the unit 100B is compactly and intimately received in the case "C". As is seen from FIG. 5B, each part of the shaped unit has a laminated structure including first insulating film 24, positive electrode layer 12, separator film 11, negative electrode layer 13 and second insulating film 25.

The entire contents of Japanese Patent Application 11-220907 (filed Aug. 4, 1999) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. A multilayer battery cell comprising:
   a separator film that is ion-conductive;
   a positive electrode layer substantially entirely disposed on one surface of said separator film, said positive electrode layer being produced from a first predetermined composition;
   a negative electrode layer substantially entirely disposed on the other surface of said separator film, said negative electrode layer being produced from a second predetermined composition;
   a first conductive layer substantially entirely disposed on said positive electrode layer and electrically connected to the same; and
   a second conductive layer substantially entirely disposed on said negative electrode layer and electrically connected to the same,
   wherein said first conductive layer has a first edge portion that is led to the one surface of said separator film while covering an edge of said positive electrode layer to establish electric connection of said first conductive layer with both said separator film and said positive electrode layer and wherein said second conductive layer has a second edge portion that is led to the other surface of said separator film while covering an edge of said negative electrode layer to establish electric connection of said second conductive layer with both said separator film and said negative electrode layer.

2. A multilayer battery cell as claimed in claim 1, further comprising:
   a first insulating layer generally entirely disposed on said first conductive layer and having a third edge portion that is led to the one surface of said separator film while covering aligned edges of said first conductive layer and said positive electrode layer, said first insulating layer having a cut out portion through which said first edge portion of said first conductive layer is exposed to the outside; and
   a second insulating layer generally entirely disposed on said second conductive layer and having a fourth edge portion that is led to the other surface of said separator film while covering aligned edges of said second conductive layer and said negative electrode layer, said second insulating layer having a cut out portion through which said second edge portion of said second conductive layer is exposed to the outside.

3. A multilayer battery cell as claimed in claim 2, in which each of said first and second insulating layers is constructed of an airtight and waterproof material.

4. A multilayer battery cell as claimed in claim 3, in which said positive and negative electrode layers, said first and second conductive layers and said first and second insulating layers are each provided by a spraying process.

5. A multilayer battery cell as claimed in claim 4, in which at least one of said positive and negative electrode layers includes an ionizable material, so that upon charging and discharging, ion transfer takes place between said positive and negative electrode layers through said separator film.

6. A multilayer battery cell as claimed in claim 5, in which said separator film comprises a porous plastic film that has pores filled with ion-conductive additive.

7. A multilayer battery cell as claimed in claim 6, in which said positive electrode layer comprises lithium oxide composition and in which said negative electrode layer comprises carbon.

8. A multilayer battery cell comprising:
   an ion-conductive separator film including a porous plastic film that has pores filled with ion-conductive additive;
   a positive electrode layer disposed on one surface of said separator film, said positive electrode layer being provided by applying on the surface of said separator film an oxide of lithium metal complex;
   a negative electrode layer disposed on the other surface of said separator film, said negative electrode layer being provided by applying on the other surface of said separator film a carbon powder or an oxide of lithium metal complex;
   a first conductive layer disposed on said positive electrode layer and electrically connected to the same, said first conductive layer having a first portion that is in contact with both said separator film and said positive electrode layer;
   a second conductive layer disposed on said negative electrode layer and electrically connected to the same, said second conductive layer having a second portion that is in contact with both said separator film and said negative electrode layer;
   a first insulating layer disposed on said first conductive layer and having a portion that is in contact with both said separator film and said positive electrode layer; and
   a second insulating layer disposed on said second conductive layer and having a portion that is in contact with both said separator film and said negative electrode layer,
   wherein said positive and negative electrode layers, said first and second conductive layers and said first and second insulating layers are each provided by a spraying or printing process and wherein upon charging and discharging, ion transfer takes place between said positive and negative electrode layers through said separator film.

9. A multilayer battery cell as claimed in claim 8, in which said separator film is constructed of a plastic selected from a group consisting of polyethylene (PE), polypropylene (PP) and polyimide.

10. A multilayer battery cell as claimed in claim 8, in which the oxide of lithium metal complex used for the positive and negative electrode layers is selected from a group consisting of $LiCoO_2$, $LiMn_2O_4$, $LiMnO_2$ and $LiNiO_2$.

* * * * *